United States Patent [19]
Steinbruchel

[11] 3,941,663
[45] Mar. 2, 1976

[54] MULTI-EFFECT EVAPORATOR

[75] Inventor: Armando B. Steinbruchel, San Diego, Calif.

[73] Assignee: Aqua-Chem, Inc., Milwaukee, Wis.

[22] Filed: July 3, 1972

[21] Appl. No.: 268,611

[52] U.S. Cl............ 202/174; 159/2 MS; 159/17 R; 159/DIG. 8
[51] Int. Cl.² ........................................ B01D 3/02
[58] Field of Search .......... 159/17 R, 2 MS, DIG. 8; 202/174, 173

[56] References Cited
UNITED STATES PATENTS

| | | | |
|---|---|---|---|
| 2,165,044 | 7/1939 | Fox et al. | 202/174 |
| 2,944,599 | 7/1960 | Frankel | 159/2 MS |
| 3,180,805 | 4/1965 | Chirico | 159/2 MS |
| 3,192,131 | 6/1965 | Loebel | 159/2 MS |
| 3,216,910 | 11/1965 | Langer | 159/2 MS |
| 3,351,120 | 11/1967 | Goeldner | 159/DIG. 8 |
| 3,442,765 | 5/1969 | Levite | 159/2 MS |
| 3,630,851 | 12/1971 | Kawaguchi et al. | 202/173 |
| 3,713,989 | 1/1973 | Bom | 159/2 MS |
| 3,729,383 | 4/1973 | Goeldner | 202/173 |

*Primary Examiner*—Norman Yudkoff
*Assistant Examiner*—Frank Sever
*Attorney, Agent, or Firm*—Fred Wiviott

[57] ABSTRACT

Distillation apparatus having a plurality of substantially identical effects arranged in a side-by-side relation. Each effect includes means for distributing feed liquid as a thin film over the outer surfaces of tubes of a horizontally oriented heat exchange tube bundle for condensing a portion of vapor disposed therein. A portion of the feed liquid evaporates and is provided as the vapor to the heat exchange tubes of the next succeeding effect and the unevaporated feed liquid in each effect is passed to the next succeeding lower effect where a portion vaporizes by flash evaporation. An uncondensed portion of the vapor exits the heat exchange tubes for condensing on a feed liquid preheater associated with each effect. Each effect is disposed in substantially identical cylindrical sections for being joined in a unitary assembly. Suitably apertured transverse divider panels between each effect permit the passage of feed water and vapor between effects.

10 Claims, 9 Drawing Figures

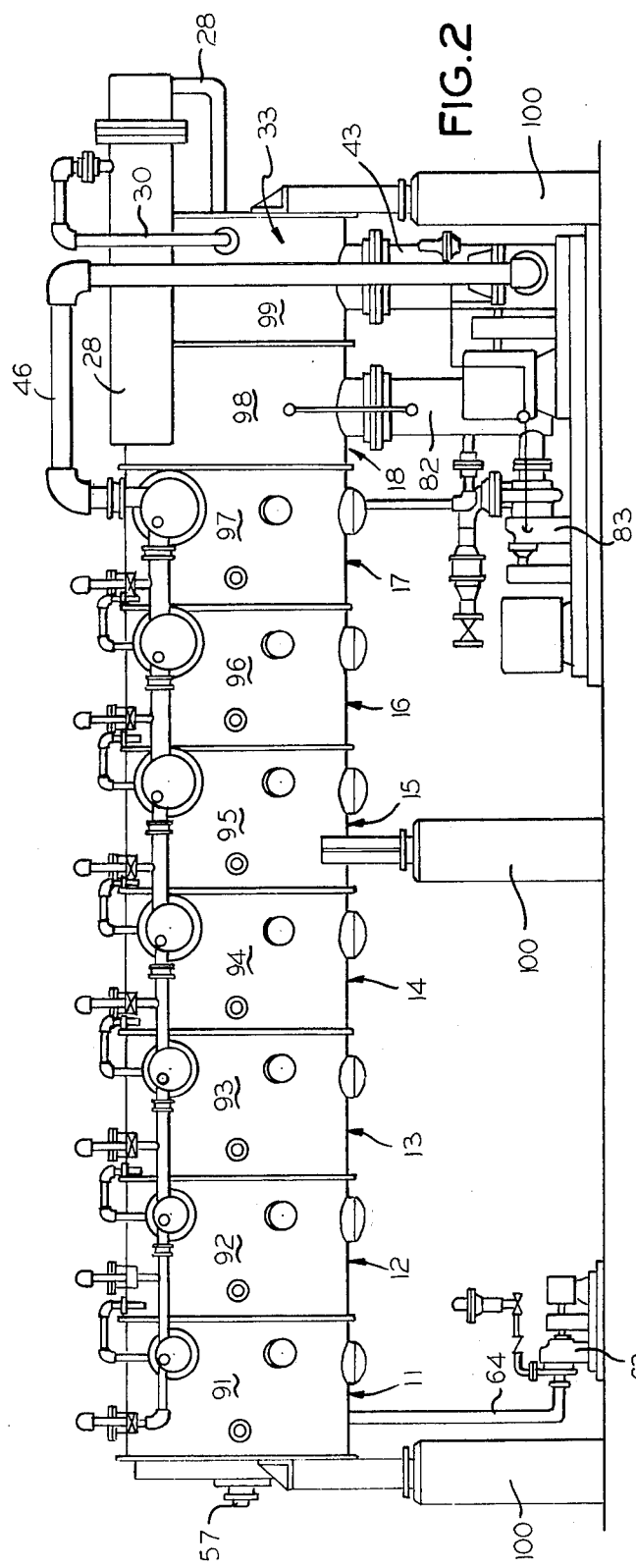
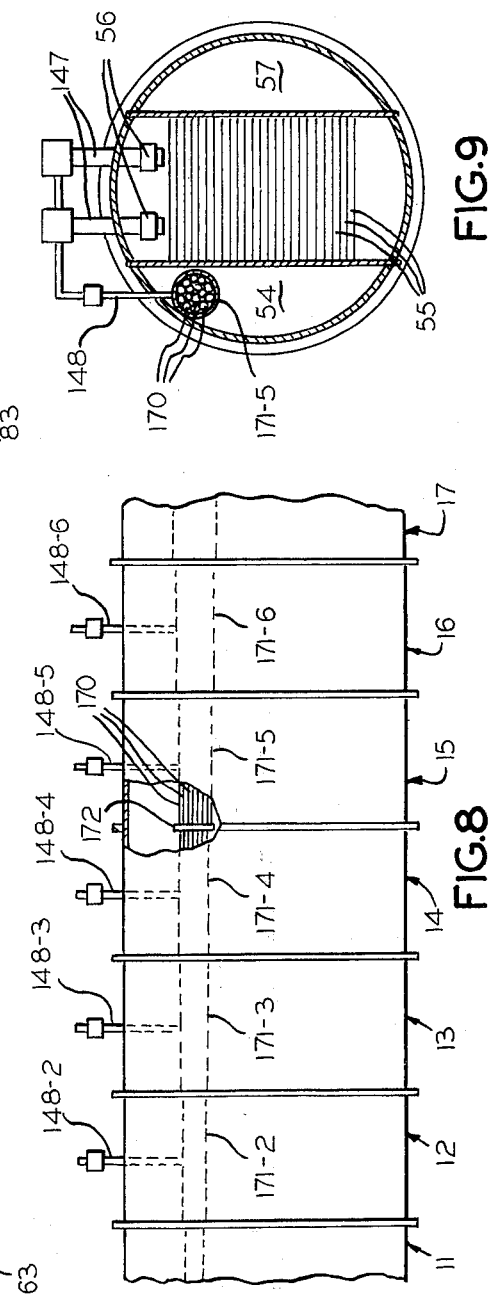

MULTI-EFFECT EVAPORATOR

BACKGROUND OF THE INVENTION

This invention relates to distillation apparatus and more particularly to multi-effect evaporators.

Multi-effect evaporators of the type wherein portions of the feed liquid are successively evaporated in a series of progressively lower temperature effects are well known. In one type of multi-effect evaporator, a vapor is condensed in each effect to evaporate a portion of the feed liquid with the resulting vapor employed for feed liquid evaporation in a lower temperature effect. In multi-effect evaporators of this type, the individual effects may be disposed one above the other in a vertical array or horizontally in a side-by-side fashion. The vertical arrangement of effects may be costly because a relatively large vertical housing is required. In horizontally arranged evaporators, the effects are generally fabricated in individual tanks or housing which require substantial interconnecting piping. Because distilling apparatus of this type are generally installed in underdeveloped areas, it is desirable to minimize on-site construction and assembly. Further, prior art side-by-side effects have the disadvantage of requiring a separate feed liquid distributing pump for each effect.

SUMMARY OF THE INVENTION

It is an object of the invention to provide a new and improved multi-effect evaporator.

Another object of the invention is to provide a multi-effect evaporator the individual effects of which are arranged in substantially identical modules.

Yet another object of the invention is to provide a multi-effect evaporator in which on-site construction and assembly is minimized.

A further object of the invention is to provide a multi-effect evaporator wherein only a single feedwater pump is required.

These and other objects and advantages of the instant invention will become more apparent from the detailed description thereof taken with the accompanying drawings.

BRIEF DESCRIPTION OF THE DRAWINGS

FIG. 2 is a side elevational view of the multi-effect evaporator shown in FIG. 1;

FIGS. 8 and 9 illustrate an alternate embodiment of the invention.

DETAILED DESCRIPTION OF THE PREFERRED EMBODIMENT

Figure 1:
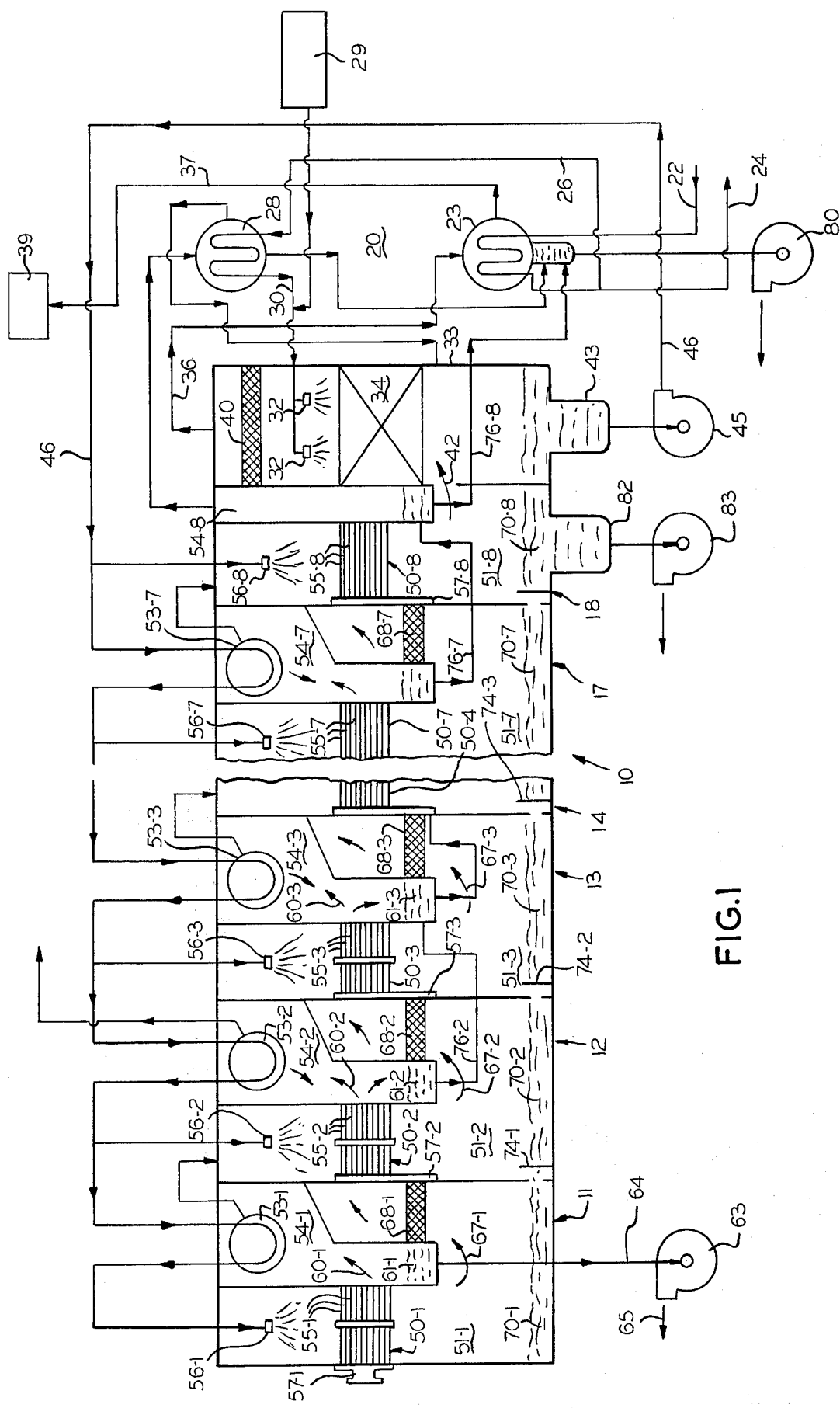
FIG. 1 schematically illustrates the multi-effect evaporator to which the present invention is applicable.

FIG. 1 schematically illustrates a multi-effect distillation apparatus 10 according to the preferred embodiment of the invention which will be discussed in relation to the distillation of sea water, although the inventive concept may also be employed for the distillation of other liquids as well. While the invention will be discussed in relation to distillation apparatus having eight effects, numbered 11, 12, 13, 14, 15, 16, 17 and 18, those skilled in the art will appreciate that the number of effects may vary with requirements and the design parameters of the system.

When the apparatus 10 is employed for the distillation of sea water, the latter initially passes through a heat rejection and chemical treatment system 20 where it is preheated, receives chemical treatment, and is deaerated and degassed. After this pretreatment, the feed water is passed through heat exchangers associated with each effect and a portion of the total is then provided as the feed water for that effect.

Sea water is introduced into the system 10 by a suitable sea water pump (not shown) through a pipe 22 and to a final condensor and distillate cooler 23 where it extracts heat from the evaporator distillate and condenses the vapor exiting from effect 18. After passing through final condensor 23, a first portion of the sea water is discharged through conduit 24 and a second portion is provided through conduit 26 to the feedwater preheater 28, where the feed water receives heat from vapor exiting from the heat exchange tubes of effect 18. The warmed sea water from preheater 28 receives a suitable scale preventing chemical, such as polyphosphate, from source 29 and is then conducted by pipe 30 to the spray nozzles 32 of deaerator 33. As those skilled in the art will appreciate, nozzles 32 will be fabricated of a suitable corrosion resistant material such as stainless steel. While the chemical is shown as being inserted into the system prior to deaeration, those skilled in the art will appreciate that it may be injected at other points in the system such as after exiting the deaerator 33.

The deaerator 33 is of a type well known in the art and includes a suitable packing 34 for providing a large contact area for vapor and liquid. A vent 36 connects deaerator 33 to the vapor chamber of the final condensor 23 and the latter in turn is vented by conduit 37 to a vacuum system 39. As the feed water passes through the packing bed 34, dissolved gases are released for withdrawal through vent 36. A demister 40 may be provided in the upper end of the deaerator 33 for removing water from the vented gas stream. The vapor produced in the effect 18 as symbolized by the arrow 42, is conducted into the deaerator 33 and pass upwardly through the packing bed 34 to scrub the feed water stream and thereby enhance the removal of dissolved gases. The deaerated feed water is collected in a sump 43 in the lower end of the deaerator 32 and is then fed to the effects 11-18 through main feed water conduit 46 by pump 45.

In order to simplify the discussion, when discussing parts of all the effects 11–18 a general reference numeral is used and when discussing a part of a particular effect the same reference numerals will be employed along with suffixes 1–8 corresponding to effects 11–18. Effects 11–17 are substantially similar and each include a heat exchange tube bundle 50 disposed in an evaporating space 51 and a feed water preheater 53 coupled to a condensate collecting space 54. Each heat exchange tube bundle 50 includes a plurality of heat exchange tubes 55 arranged generally horizontally and extending through the evaporating space 51 and between a vapor distributing space 57 and the condensate collecting space 54. Feed water is distributed as a thin film over the exterior of the heat exchange tubes 55 of each bundle 50 by any suitable means such as a nozzle 56. Effect 18 differs from the remaining effects in that, among other things, it does not include a feed water preheater in its condensate collecting space 54-8.

The nozzle 56-8 of effect 18 is connected directly to the main feed water pipe 46. In each of effects 11-17 the feed water from the preceeding effect passes through each effect preheater 53 coupled to its respective condensate collecting space 54 and a portion is then provided to the spray nozzle 56 of such effect and the remaining feed water is passes on to the feed water preheater 53 of the next higher effect. Thus, the feed water provided to each effect has been preheated in the feed water preheater 53 of each lower temperature effect.

The vapor distributing space 57-1 of effect 11 may receive heating steam at a suitable temperature, such as 212° F, for example, from any available source. A first portion of the steam provided to the heat exchange tubes 55-1 of effect 11 condenses on the interior of said tubes to evaporate a portion of the feed water passing as a thin film over the exterior surfaces thereof. A second portion of the steam symbolized by the arrows 60 exits from the heat exchange tubes 55-1 and condenses on the feed water preheater 53-1 for preheating the feed water passing therethrough. The condensate 61-1 exiting from heat exchange tubes 55-1 and that condensed in the feed water preheater 53-1 is collected in the lower end of the condensate collecting chamber 54-1 of effect 11 for return by pump 63 and conduits 64 and 65 to the source of heating steam.

The evaporated feed water in effect 11, symbolized by arrows 67-1, passes through moisture separator or demister element 68-1 and to the interior of heat exchange tubes 55-2 of effect 12. The unevaporated feed water 70-1 collects in the lower end of the evaporating space 51-1 of effect 11 and which is connected to effect 12 through openings formed in the walls which separate effect 11 from effect 12. A weir 74-1 extends across the openings between effects 11 and 12 to control the flow of unevaporated feed water and thereby provide a seal against the pressure difference between said effects. Because effect 12 is at a lower temperature and pressure than effect 11, a portion of the feed water 70-1 passing through the opening between effects 11 and 12, flash evaporates. The vapor produced by this flash evaporation joins the evaporated feed water 67-2 in evaporating space 51-2 of effect 12 for passage through demister 68-2 and into the tubes 55-3 of effect 13. In addition, the condensate 61-2 collected in condensate collecting space 54-2 of effect 12 is conducted by conduit 76-2 to the condensate collecting space 54-3 of effect 13 where a portion flash evaporates and is condensed in the feed water preheater 53-3.

The distillation procedure just discussed is repeated in each of the remaining effects 13-17. In effect 18 the vapor 42 passes through the deaerator 33 and is condensed in the final condensor 23 discussed above. The condensate from effect 18 is passed by conductor 76-8 to the final condensor 23 and from there it is delivered by pump 80 as the product water of the system. The unevaporated sea water 70-8 from effect 18 is collected in sump 82 for discharge by blow down pump 83.

Referring now to FIG. 2 each of the effects 11-18 of the distilling apparatus according to the preferred embodiment of the present invention are respectively shown to be disposed within substantially identical housing portions 91-98, respectively, which may take the form of cylindrical sections. These housing portions are joined in an end-wise relation to provide an elongated cylindrical housing for containing the entire assembly. The deaerator 33 may be disposed in a similar cylindrical housing section 99 which is joined to housing 98 of effect 18 and the entire assembly may be supported in any suitable manner such as on supports 100.

Figure 4:
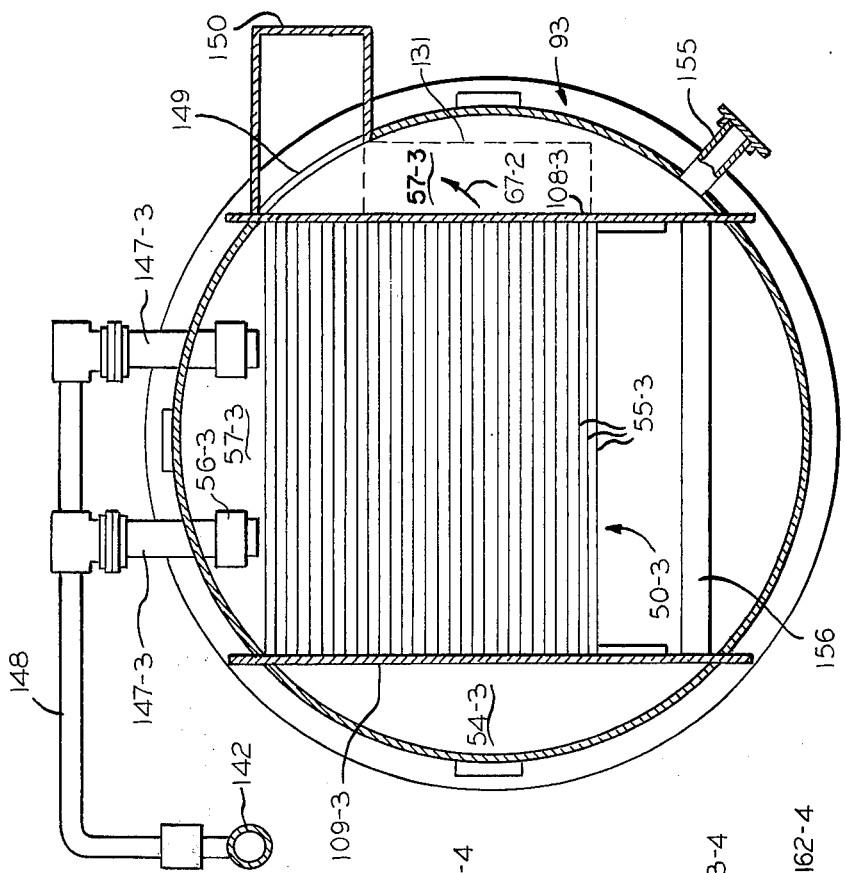
FIG. 4 is a view taken along lines 4—4 of FIG. 3.
Figure 3:
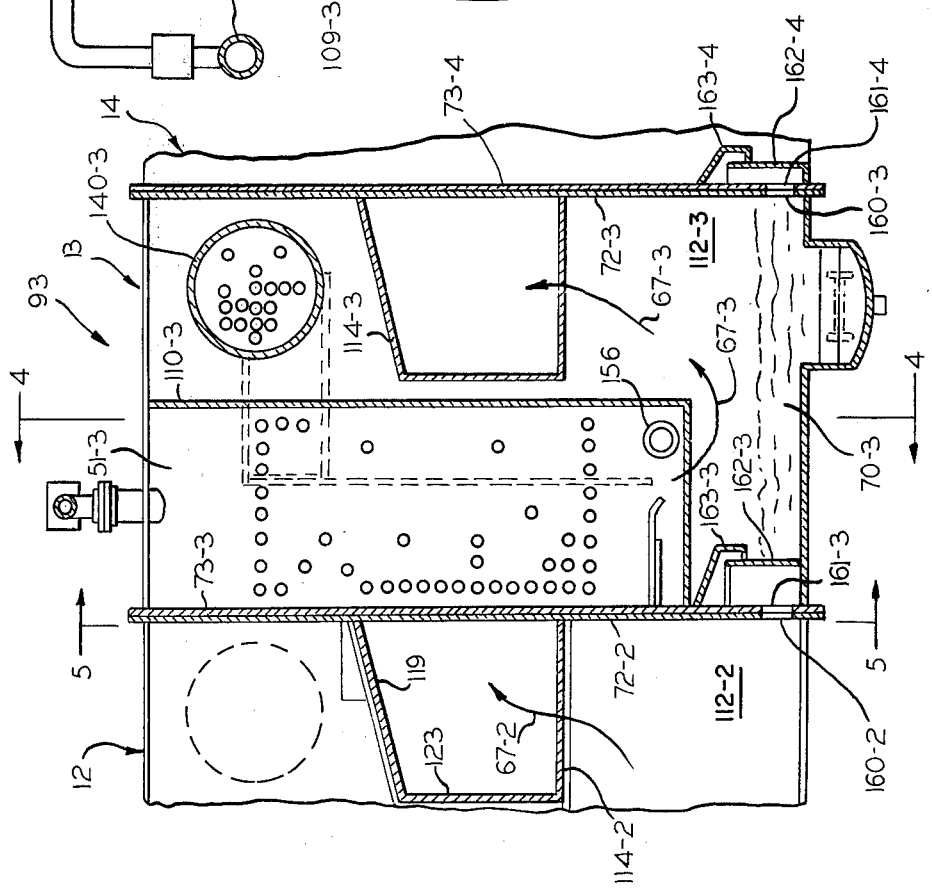
FIG. 3 is a view of the effects of the evaporator shown in FIG. 2 with parts broken away.

As indicated above, each of the effects 11-18 are substantially identical. Accordingly, effect 13, which is typical, will be discussed in relation to FIGS. 3-7. Referring now to FIG. 3, effect 13 is shown to have a pair of end panels 72-3 and 73-3 disposed on the opposite ends of the cylindrical housing 93 and for being joined with corresponding end panels of the adjacent effects 12 and 14. Referring now to FIG. 4, the heat exchange bundle 50-3 is shown to include a plurality of heat exchange tubes 55-3 whose opposite ends are fixed in tube sheets or walls 108-3 and 109-3 which are secured in a vertical spaced apart relation in the housing 93. Tube sheets 108-3 and 109-3 extend from the end wall 73-3 to a second wall 110-3 (see FIGS. 3 and 5) intermediate the ends of housing 93 and which extends from the upper end of housing 93 to a point above the lower end thereof. The tube sheets 108-3 and 109-3 and the walls 73-3 and 110-3 define an evaporating space 51-3 surrounding the tube bundle 50-3. With reference to FIG. 4, the tube sheet 109-3, walls 72-3 and 73-3 and the adjacent portion of housing 93 defines a condensate collecting space 54-3. Similarly, the tube sheet 108-3, the walls 72-3 and 73-3 and the adjacent portion of housing 93 defines a vapor distributing space 57-3. Also, the wall 110-3, the wall 72-3 and the intermediate portion of the housing 93 define a vapor receiving space 112-3.

Figure 7:
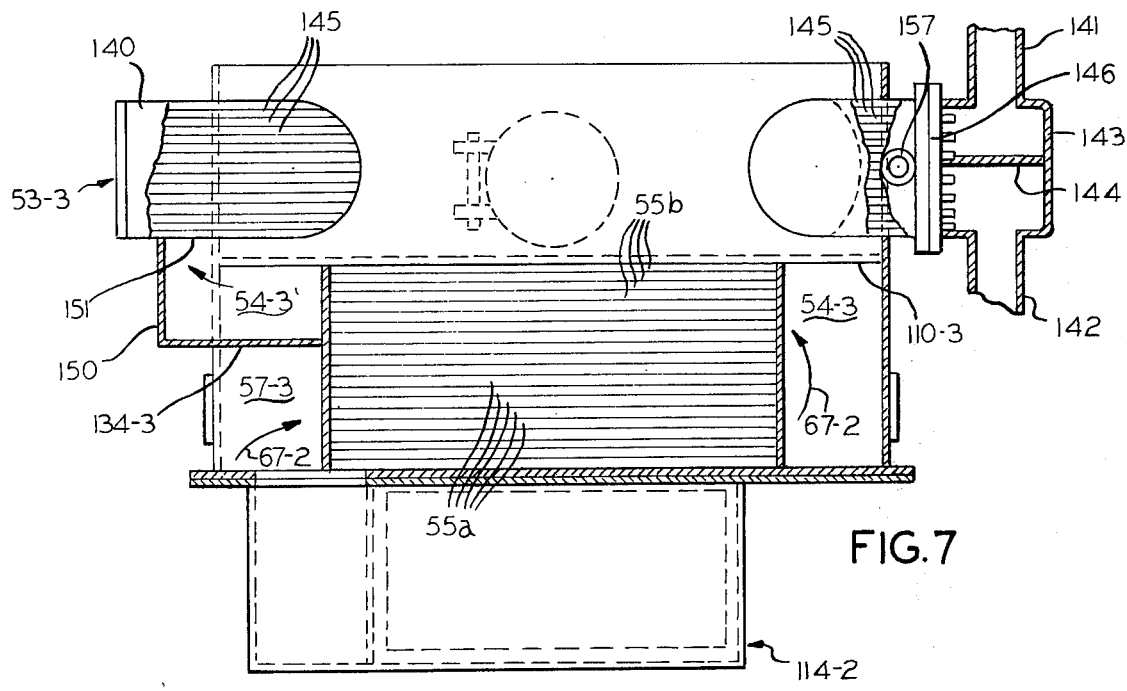
FIG. 7 is a top plan view of the effect shown in FIG. 3 with parts broken away.
Figure 5:
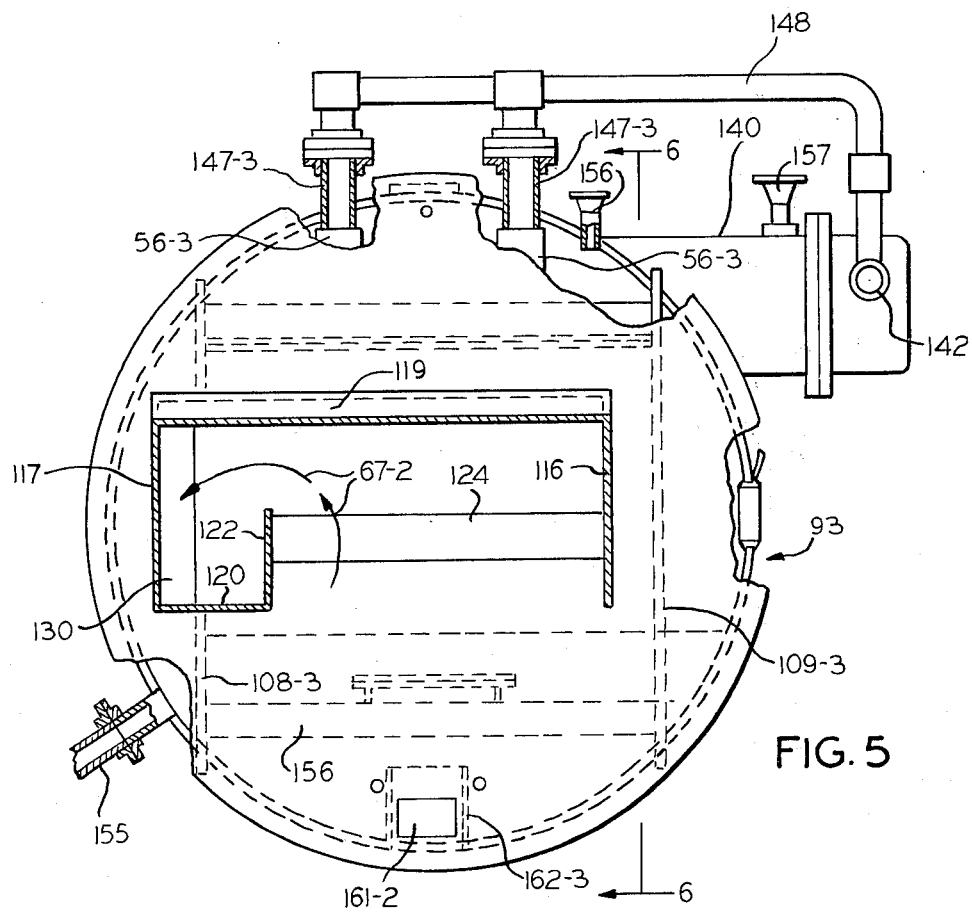
FIG. 5 is a view taken along lines 5—5 of FIG. 3.
Figure 6:
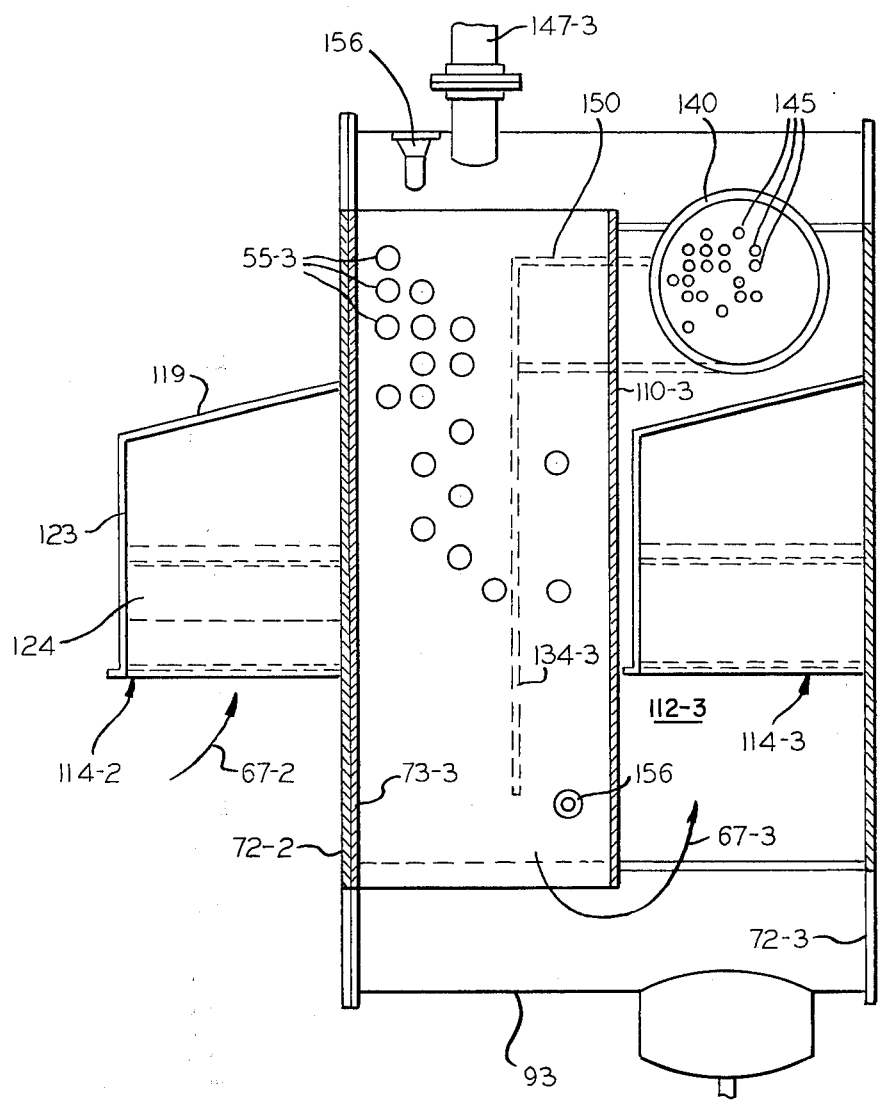
FIG. 6 is a view taken along lines 6—6 of FIG. 5.

Attached to the end panel 72-2 of effect 12 is a vapor conducting hood 114-2. As seen in FIGS. 5 and 7, the hood 114-2 is generally rectangular and includes a first side wall 116 opposite tube sheet 109-3, a second side wall 117 which is adjacent the vapor distributing space 57-3 and a top wall 119 extending between the sides 116 and 117. The bottom of hood 114 is open except for a short bottom wall 120 extending from side wall 117 to a short intermediate vertical section 122 which extends a partial distance toward the top wall 119. In addition, a front wall 123 extends downwardly from the top wall 119 and between the side walls 116 and 118. A moisture separator or demister element 124 is disposed in the open bottom of hood 114-2 and between the side wall 116, the vertical section of 122 the front panel 123 and the wall 72-2.

As seen in FIGS. 4 and 5 registering openings 130 and 131 are respectively formed in walls 72-2 of effect 12 and 73-3 of effect 13. Openings 130 and 131 place the evaporating space 51-2 of effect 12 in communication with the vapor distributing space 57-3 of effect 13. It will be appreciated, therefore, that the vapor 67-2 generated in effect 2 will pass upwardly through demister 124 around section 122, through openings 130 and 131 and into the vapor distributing space 57-3 on the inlet end of the tubes 55-3 of tube bundle 50-3. A similar hood 114-3 is mounted on wall 72-3 of effect 13 for conducting vapor generation in effect 13 to the heat exchange tubes of effect 14.

It may be desirable in the higher temperature effects, such as effects 11-14, to divide the heat exchange tubes into two groups 55a and 55b in such a manner that the vapor passes first through tubes 55a where a portion is condensed and the uncondensed vapor then passing through tubes 55b. The division of tubes is made such that there are substantially more tubes in the first pass group 55a than in the second pass group 55b so that at least some vapor passes through a majority of the tubes to sweep the condensate formed in said tubes out into the condensate collecting chamber 54-3. Toward this end, a vertical partition 134-3 is provided between the housing 93 and the tube sheet 108-3 for dividing the vapor distributing space 57-3 at the inlet ends of the first pass tubes 55a from a second condensate collecting chamber 54-3' at the outlet ends of the second pass tubes 55b. The uncondensed vapor exiting from the tubes 55a in condensate collecting chamber 54-3 reverses and enters the second pass tubes 55b where a second portion of the vapor is condensed and collected in the second condensate collecting chamber 54-3'. In addition, a portion of the vapor exits from the tubes 55b for being condensed on the feed water preheater 53-3 as will be described more fully below. This insures a sweeping action in both tubes 55a and 55b.

The feed water preheater 53-3 is disposed within a cylindrical housing 140 which extends transversely across the housing 93 and above the hood 114-3. Sea water enters the heat exchanger 53-3 through pipe 141 (FIG. 7) and exits through pipe 142. A header 143 disposed on the end of the housing 140 includes a partition 144 which divides the feed water entering through pipe 141 and that exiting through pipe 142. Disposed within housing 140 are a plurality of heat exchange tubes 145 which may be generally U-shaped and have opposite open ends fixed in a tube sheet 146 and on each side of the header partition 144. As a result, the feed water enters through pipe 141, passes downwardly to the end of housing 140 and back through heat exchange tubes 145 and exits through pipe 142.

As seen in FIG. 4, a pair of feed water nozzles 56-3 are provided in effect 13 above the heat exchange tubes 55-3 and each is coupled to one of a pair of inlets 147-3 for receiving feed water preheated in preheater 53-3.

Referring now to FIGS. 4 and 7 an opening 149 is shown to be formed in housing 93 at the upper end of the second condensate collecting space 54-3' and is connected by a housing 150 to an opening 151 formed in the preheater housing 140. As a result, uncondensed vapors exiting the second pass heat exchange tubes 55b, pass into the feed water preheater housing 140 before being condensed on the heat exchange tubes 145 disposed therein. The distillate condensed in feed water preheater housing 140 drains back into the second condensate collecting chamber 54-3' and may be removed from the lower end thereof by conduit 155. A pipe 156 extends between the tube sheets 108 and 109 and from the first condensate collecting chamber 54-3 to the second condensate chamber 54-3' so that the vapor condensed in the first pass heat exchange tubes 55a may also be removed by a pipe 155. Normal venting is provided by vents 156 and 157.

As seen particularly in FIG. 3, openings 160-2 and 161-3 are respectively formed in each of the end walls 72-2 and 73-3 adjacent their lower ends. A weir 162-3 consisting of a generally U-shaped member is attached to the inside face of wall 73-3 and around openings 160-2 and 161-3. Corresponding openings 160-3 and 161-4 are formed in walls 72-3 and 73-4 of effects 13 and 14. A hood 163-3 may be affixed above weir 162-3 to prevent feed water from splashing upwardly as it passes between effects. In this manner, the unevaporated feed water in each effect may flow to the evaporating chamber of the next lowest effect which is at a lower temperature pressure. Accordingly, a portion of this feed water flash evaporates and is added to the vapor produced as a result of feed water evaporation on tubes 55. It will be noted that the upper ends of the weirs 162-3 and 162-4 are higher than the upper ends of the openings between effects so that the depth of feed water in each effect will remain above said openings. Accordingly, a vapor seal will be maintained between effects to insure the proper pressure and temperature differential.

To summarize the operation of the evaporator briefly with reference to effects 12, 13 and 14, the incoming feed water to effect 13 enters feed water preheater through pipe 141 and exits through pipe 142. A portion of the exiting feed water is conducted through pipe 148 to the spray nozzles 56-3 for being sprayed over the outer surfaces of the heat exchange tubes 55. The vapor from effect 12 enters hood 114-2 and passes through openings 130 and 131 into the vapor distributing space 57-3 of effect 13. The vapor then enters the first pass heat exchange tubes 55-3 for evaporating a portion of the feed water cascading downwardly from the nozzles 56-3. A portion of the vapor is condensed in the first pass heat exchange tubes 55a and is collected in the first condensate collecting chamber 54-3. The uncondensed portion of the vapor exiting tubes 55a passes into the second pass heat exchange 55b as seen in FIG. 7 where a second portion is condensed and collects in condensate collecting chamber 54-3'. The remaining uncondensed vapor is passed into the feed water preheater housing 140 for being condensed on the feed water preheater tubes 145. The feed liquid evaporated on the outer surfaces of the heat exchange tube 55a and 55b, as symbolized by arrows 67-3, passes downwardly around the partition 110 (See FIGS. 3 and 6) and upwardly into the hood 114-3 for being conducted to the heat exchange tubes of effect 14. The unevaporated feed liquid 70-3 collects in the lower end of the housing 93 for being passed into effect 14 through openings 160-3 and 161-4 where a portion flash evaporates.

It can be seen that each of the effects 11-18 are identical and may be joined into and by coupling the flanges on their respective walls 72 and 73. In this manner also, lesser or greater numbers of effects may be employed without modification in design or construction. Further, the open passages for conducting feed liquid and vapor between effects minimizes pressure drops thereacross.

FIGS. 8 and 9 show an alternate embodiment of the invention wherein the preheater tubes 170 extend in the axial direction and continuously through the connected effects 11-17. Some of the individual tubes 170 terminate in each effect and branch off into the feed water nozzle connecting pipes 148. The tubes 170 in each effect are surrounded by a housing 171 which is sealed at its opposite ends by tube sheets 172. Because the number of tubes diminishes in each succeedingly higher effect, from effect 17 to effect 11, the succeeding housings 171 may have smaller diameters as shown in FIG. 8. Each of the individual housings 171-1 to 171-7 will be connected to its respective condensate collecting space 54-1 to 54-7 in a manner analogous to that discussed with respect to the embodiment of FIGS. 1-7.

While only a few embodiments of the invention have been shown and described, it is not intended to be limited thereby but only by the scope of the appended claims.

I claim:

1. An evaporator having a plurality of effects, a plurality of said effects including an outer housing portion disposed with its axis substantially horizontal and being generally curvilinear in a plane transverse to said axis, each housing portion including first and second pairs of spaced substantially vertical walls disposed in a substantially rectangular array, one of the walls of said first pair intersecting a first part of said housing portion to form therewith a vapor distributing space and a second one of the first pair of said walls intersecting a second part of said housing to form therewith a distillate collecting chamber, said first and second pairs of vertical walls defining an evaporating space with the upper and lower margins of said housing, a plurality of heat exchange tubes extending substantially horizontally through said evaporation space and between said first pair of vertical walls and opening at one end into said vapor distributing space and at their other ends into said distillate collecting space, a first one of said second pair of vertical walls of each effect being disposed at one end of said housing portion and the other of said second pair of walls being disposed intermediate the ends of said housing portion and extending from the upper end thereof and defining a vapor receiving space with the other end of said housing portion, an aperture formed in the lower end of the other one of said second pair of vertical walls for connecting said evaporating space to said vapor receiving space whereby vapor generated in the evaporating space of each effect is flowed downwardly and through said aperture, feed liquid distributing means disposed in said evaporating space and above said heat exchange tubes for distributing feed liquid as a thin film over the outer surfaces of said tubes, the housing portions of each effect being joined end to end in a substantially horizontal array to form a unitary housing for said evaporator, means for coupling the vapor distributing space of the first one of said effects to a source of steam, means for coupling the evaporating space of the last one of said effects to condensing means, the first one of the second pair of walls of each effect having a first opening formed therein and communicating with the vapor receiving space of the respective next higher effect for passage of vapor to the vapor distributing spaces of said effects from said respective next higher effects, a second opening formed in the lower end of the first one of said second pair of walls of each effect for permitting the flow of unevaporated feed liquid between effects, and feed liquid preheater means disposed in at least some of said effects and including a preheater housing surrounding said feed liquid preheater means and having an opening formed therein, said opening being coupled to the condensate collecting space of its respective effect for conducting uncondensed vapor exiting from the effect heat exchange tubes to said feed liquid preheater means.

2. The evaporator set forth in claim 1 and wherein at least some of said effects include hood means mounted in said vapor receiving space adjacent the first opening in the first one of said second pair of walls and having a first portion communicating with the vapor receiving space of such effects and another portion communicating with said first opening so that said hood collects vapor generated in said effects whereby the same is collected and conducted through said first opening to the next succeeding effect.

3. The evaporator set forth in claim 1 wherein said feed liquid preheater means of said effects are serially connected to each other and each being connected to the feed liquid distributing means in its respective effect as the sole source of feed liquid therein.

4. The evaporator set forth in claim 3 wherein the preheater housings in said at least some effects is oriented in a direction generally transverse to the axis of said outer housing, said feed liquid preheater means including a plurality of tube means extending longtudinally of said preheater housing.

5. The evaporator set forth in claim 3 wherein the preheater housings in said at least some effects extend in a direction generally parallel to the axis of said housing and are arranged in generally horizontal alignment, said feed liquid preheater means including a plurality of tubes extending through said aligned housings, certain of said tubes terminating in at least some of said effects to provide the feed liquid for said effects.

6. The evaporator set forth in claim 1 wherein said first pair of walls are disposed in a generally parallel relation to each other and extend generally in the direction of said longitudinal axis, said second pair of walls are disposed substantially parallel to each other and normal to said axis.

7. The evaporator set forth in claim 6 wherein the heat exchange tubes of each effect is arranged in a heat exchange tube bundle having a generally elongated cross sectional area, a first plurality of said tubes being disposed along the upper periphery of said cross sectional area for direct exposure to said feed liquid distributing means and a second plurality of tubes disposed below said first plurality of tubes so that feed liquid distributed over said first plurality of tubes passes downwardly over said second plurality of tubes prior to collection of the unevaporated portion thereof at the lower end of said effect, the dimensions of said cross sectional area being substantially greater in said vertical direction that in the horizontal direction so that the average number of tubes disposed in any vertical path traversed by said feed liquid as it moves downwardly through said bundle is substantially greater than said first plurality of tubes, whereby said feed liquid may be passed over a large number of heat exchange tubes with a single passage through said effect and without recirculation.

8. The evaporator set forth in claim 7 and including hood means mounted on the one of said second pair of walls of at least some of said effects and adjacent the first opening in said walls, said hood means extending into the vapor receiving space of its respective effect and having a first portion in communication with said vapor receiving space and a second portion communicating with said first openings, moisture separating means disposed between the first and second portions of each hood means and wier means disposed over the second openings in each of the first one of said second pair of walls to seal the passage between effects against differences in effect pressures.

9. The evaporator set forth in claim 8 wherein said feed liquid preheater means of said effects are serially connected to each other and each is connected to the feed liquid distributing means in its respective effect as the sole source of feed liquid therein.

10. The evaporator set forth in claim 9 and including an opening formed in the second part of said housing portion of each effect, and means coupling said housing openings to the openings in the preheater housing associated with said effects, said feed water preheater housings being generally cylindrical and extending between the other of said second pair of walls and said end wall.

* * * * *